United States Patent
Kim et al.

(10) Patent No.: US 11,021,172 B2
(45) Date of Patent: Jun. 1, 2021

(54) SYSTEM FOR CONTROLLING HOST VEHICLE AND METHOD FOR CONTROLLING HOST VEHICLE

(71) Applicant: Mando Corporation, Pyeongtaek-si (KR)

(72) Inventors: Tak Gen Kim, Seongnam-si (KR); Jae Suk Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 195 days.

(21) Appl. No.: 16/420,736

(22) Filed: May 23, 2019

(65) Prior Publication Data
US 2020/0062277 A1    Feb. 27, 2020

(30) Foreign Application Priority Data

Aug. 27, 2018  (KR) .................. 10-2018-0100187

(51) Int. Cl.
*B60W 50/14*    (2020.01)
*G08G 1/16*    (2006.01)
*B60R 1/00*    (2006.01)
*G01S 13/931*    (2020.01)

(52) U.S. Cl.
CPC .............. *B60W 50/14* (2013.01); *B60R 1/00* (2013.01); *G01S 13/931* (2013.01); *G08G 1/166* (2013.01); *G08G 1/167* (2013.01); *B60R 2300/301* (2013.01); *B60R 2300/802* (2013.01); *B60W 2050/143* (2013.01); *B60W 2420/42* (2013.01); *B60W 2420/52* (2013.01); *B60W 2554/4041* (2020.02); *B60W 2554/801* (2020.02); *G01S 2013/9315* (2020.01)

(58) Field of Classification Search
CPC .............. B60R 1/00; B60R 2300/301; B60R 2300/802; B60R 2300/8026; B60R 2300/804; B60W 2050/143; B60W 2420/42; B60W 2420/52; B60W 2554/404; B60W 2554/4041; B60W 2554/801; B60W 50/14; G01S 13/867; G01S 13/931; G01S 2013/9315; G08G 1/166; G08G 1/167
See application file for complete search history.

(56) References Cited

U.S. PATENT DOCUMENTS

| | | | | |
|---|---|---|---|---|
| 2011/0293145 A1* | 12/2011 | Nogami | .................. | G06T 11/00 382/103 |
| 2013/0085636 A1* | 4/2013 | You | ...................... | B62D 15/027 701/25 |
| 2015/0346337 A1* | 12/2015 | Jung | ...................... | G01S 13/931 342/55 |
| 2017/0291547 A1* | 10/2017 | Lai | ......................... | G08G 1/167 |

* cited by examiner

*Primary Examiner* — Omer S Khan
(74) *Attorney, Agent, or Firm* — Morgan, Lewis & Bockius LLP

(57) ABSTRACT

Disclosed are a system for controlling a host vehicle including one or more image sensors and one or more radar sensors and controller configured to recognize a target vehicle and measure a front coordinate of the target vehicle and generate a warning according to whether the front coordinate of the target vehicle is located in a preset blind spot alert area of the host vehicle. The present disclosure may determine whether to activate an warning based on a front coordinate of a target vehicle and prevent a malfunction when activating the warning, thereby providing a driver with driving safety and driving convenience.

14 Claims, 19 Drawing Sheets

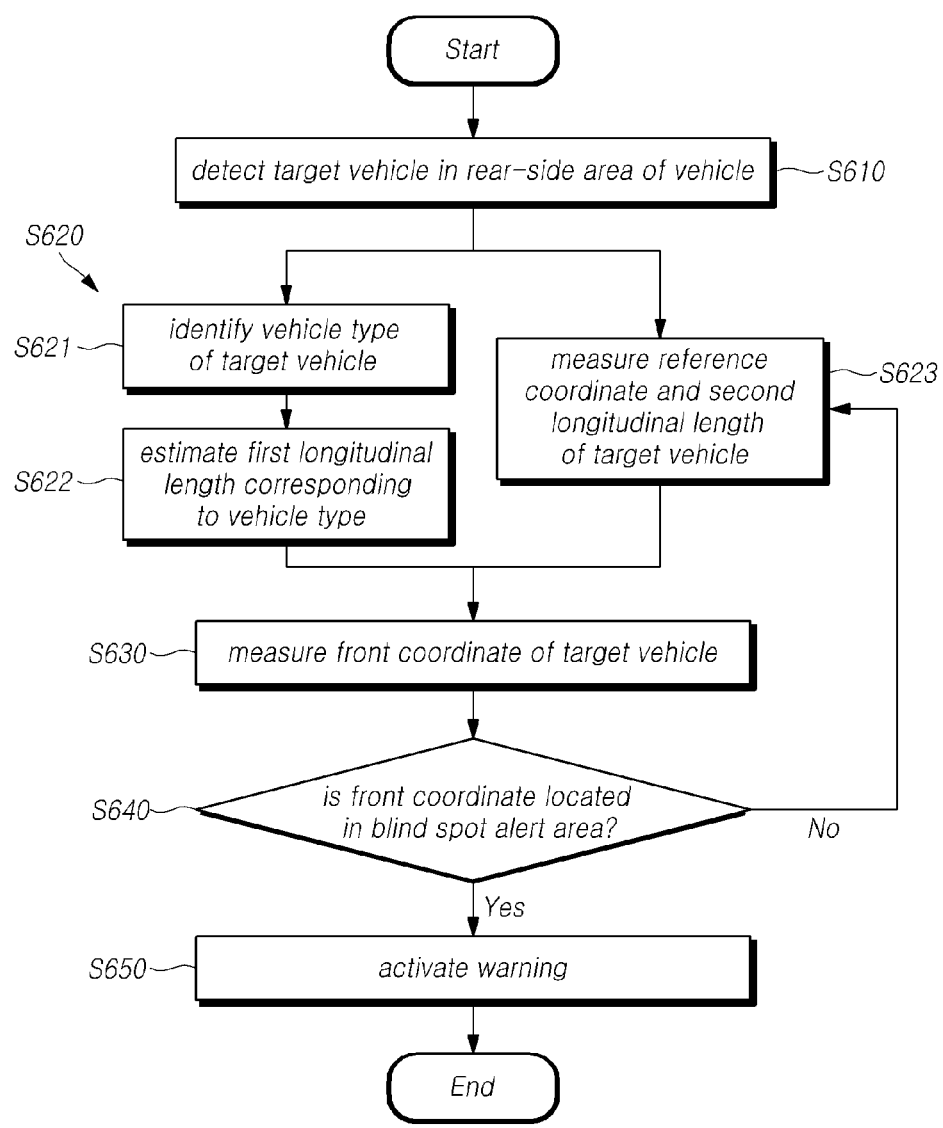

SYSTEM FOR CONTROLLING HOST VEHICLE AND METHOD FOR CONTROLLING HOST VEHICLE

CROSS REFERENCE TO RELATED APPLICATION

This application claims priority from Korean Patent Application No. 10-2018-0100187, filed on Aug. 27, 2018, which is hereby incorporated by reference for all purposes as if fully set forth herein.

BACKGROUND OF THE INVENTION

1. Field of the invention

The present disclosure relates to a system for controlling a host vehicle and a method for controlling a host vehicle.

2. Description of the Prior Art

Recently, interest in performance and convenience of vehicles has increased. As demands for performance of vehicles, convenience of drivers, and safety increase, research on and development of Advanced Driver Assist Systems (ADASs) for controlling a host vehicle to assist a driver in driving the host vehicle have been continuously conducted. As one of the ADASs, a Blind Spot Detection (BSD) system has become popularized.

The BSD system is a system in which a sensor included in the host vehicle detects a rear-side direction, and when another vehicle is detected within a predetermined blind spot alert area of the host vehicle, notifying the driver of the other vehicle by performing a warning operation.

At this time, since longitudinal lengths of other vehicles are different from each other, time points at which the other vehicles enter or escape the blind spot alert area are different from each other. Accordingly, a time point at which the BSD system provides or releases a warning is not consistent and thus cannot provide the driver with driving convenience and driving safety.

SUMMARY OF THE INVENTION

In this background, an aspect of the present disclosure is to provide a system for controlling a host vehicle and a method for controlling a host vehicle which appropriately control a warning for another vehicle approaches a blind spot of a host vehicle.

Another aspect of the present disclosure is to accurately control a time point for activating or deactivating a warning to prevent a malfunction of the warning control, thereby providing driving safety and driving convenience to a driver.

In accordance with an aspect of the present disclosure, a system for controlling a host vehicle is provided. The system includes: one or more image sensors mounted to a host vehicle to have a field of view of an exterior of the host vehicle, one or more radar sensors mounted to the host vehicle to have a sensing area of an exterior of the host vehicle and a controller communicatively connected to the one or more image sensors and the one or more radar sensors, and configured to: recognize a target vehicle detected by at least one of the one or more image sensors or the one or more radar sensors, estimate a first longitudinal length of the target vehicle which approaches the host vehicle in a front area of the host vehicle, measure a reference coordinate and a second longitudinal length of the target vehicle which goes away from the host vehicle in a rear-side area of the host vehicle, measure a front coordinate of the target vehicle based on the reference coordinate, the first longitudinal length and the second longitudinal length, and generate a warning according to whether the front coordinate of the target vehicle is located in a preset blind spot alert area of the host vehicle.

In accordance with another aspect of the present disclosure, a system for controlling a host vehicle is provided. The system includes: one or more image sensors mounted to a host vehicle to have a field of view of an exterior of the host vehicle, one or more radar sensors mounted to the host vehicle to have a sensing area of or an exterior of the host vehicle and a controller communicatively connected to the one or more image sensors and the one or more radar sensors, and configured to: recognize a target vehicle detected by at least one of the one or more image sensors or the one or more radar sensors, estimate a first longitudinal length of the target vehicle which approaches the host vehicle in a rear-side area of the host vehicle, measure a reference coordinate and a longitudinal length of the target vehicle which approaches the host vehicle in a rear-side area of the host vehicle, measure a front coordinate of the target vehicle based on the reference coordinate, the first longitudinal length and the second longitudinal length, and generate a warning according to whether the front coordinate of the target vehicle is located in a preset blind spot alert area of the host vehicle.

In accordance with an aspect of the present disclosure, a method for controlling a host vehicle is provided. The method includes: capturing image data and processing the image captured image data by one or more image sensors, capturing sensing data and processing the captured sensing data by one or more radar sensors, recognizing a target vehicle detected by at least one of the one or more image sensors or the one or more radar sensors, estimating a first longitudinal length of the target vehicle which approaches the host vehicle in a front area of the host vehicle, measuring a reference coordinate and a second longitudinal length of the target vehicle which goes away from the host vehicle in a rear-side area of the host vehicle, measuring a front coordinate of the target vehicle based on the reference coordinate, the first longitudinal length and the second longitudinal length and generating a warning according to whether the front coordinate of the target vehicle is located in a preset blind spot alert area of the host vehicle.

In accordance with an aspect of the present disclosure, a method for controlling a host vehicle is provided. The method includes: capturing image data and processing the image captured image data by one or more image sensors, capturing sensing data and processing the captured sensing data by one or more radar sensors, recognizing a target vehicle detected by at least one of the one or more image sensors or the one or more radar sensors, estimating a first longitudinal length of the target vehicle which approaches the host vehicle in a rear-side area of the host vehicle, measuring a reference coordinate and a longitudinal length of the target vehicle which approaches the host vehicle in a rear-side area of the host vehicle, measuring a front coordinate of the target vehicle based on the reference coordinate, the first longitudinal length and the second longitudinal length, generating a warning according to whether the front coordinate of the target vehicle is located in a preset blind spot alert area of the host vehicle.

As described above, the present disclosure can provide a system for controlling a host vehicle and a method for controlling a host vehicle which appropriately control a warning for another vehicle which approaches a blind spot of a host vehicle.

Further, the present disclosure can provide driving safety and driving convenience to a driver by accurately controlling a time point for activating or deactivating a warning to prevent a malfunction of the warning control.

BRIEF DESCRIPTION OF THE DRAWINGS

The above and other aspects, features and advantages of the present disclosure will be more apparent from the following detailed description taken in conjunction with the accompanying drawings, in which:

FIG. 6 is a flowchart illustrating in detail another embodiment of the method of operating the blind spot detection system according to the present disclosure;

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1A:
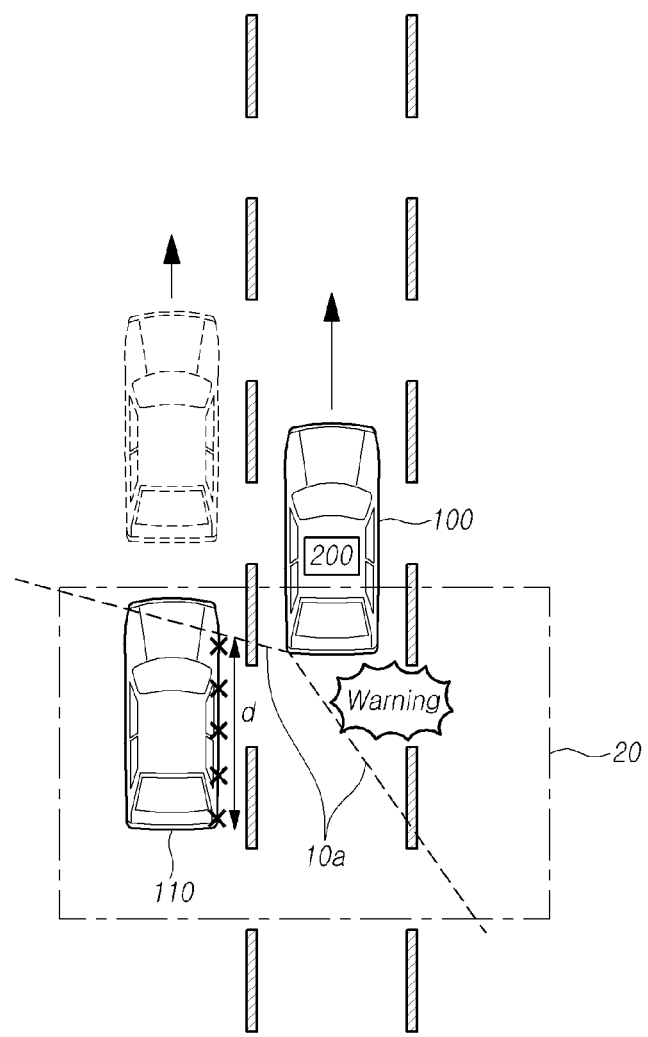
FIGS. 1A and 1B illustrate an embodiment of a blind spot detection system according to the present disclosure included in a host vehicle traveling on a road.
Figure 1B:
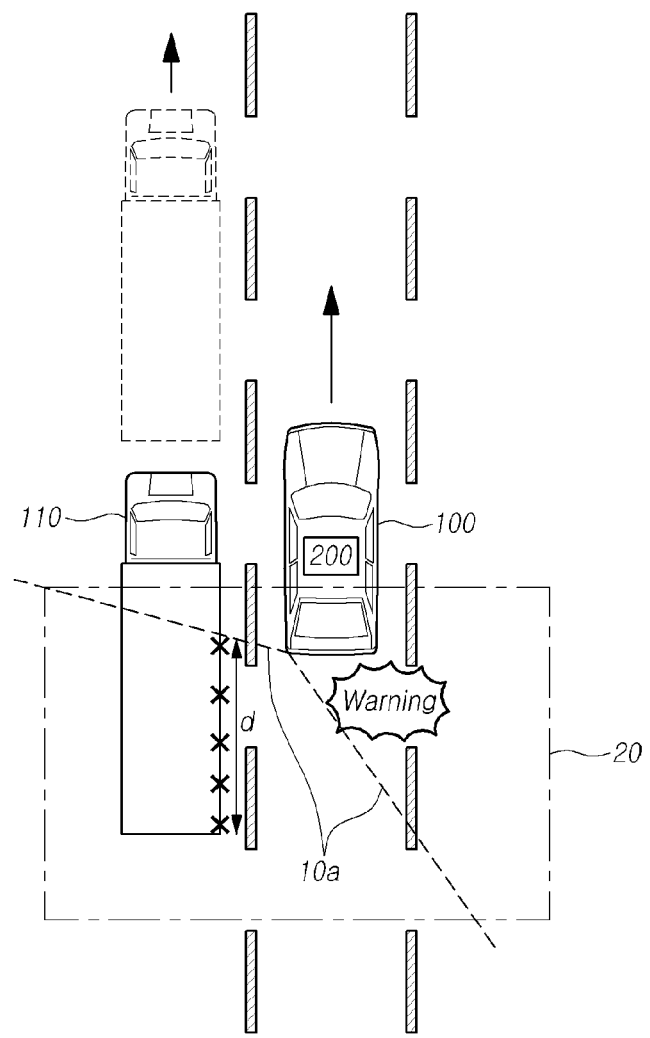
Figure 2A:
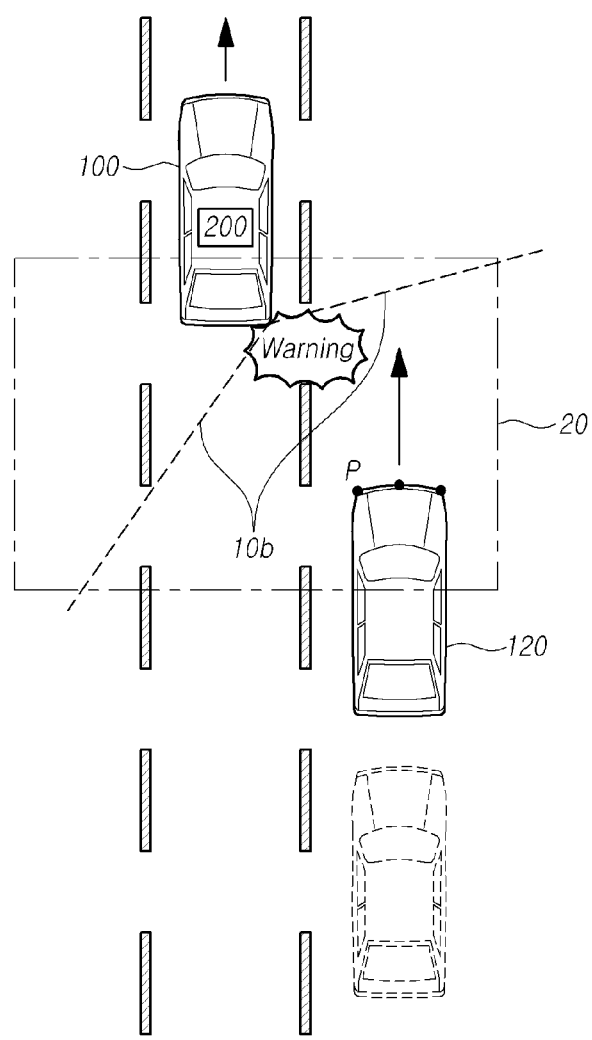
FIGS. 2A and 2B illustrate another embodiment of the blind spot detection system according to the present disclosure included in the host vehicle traveling on the road.
Figure 2B:
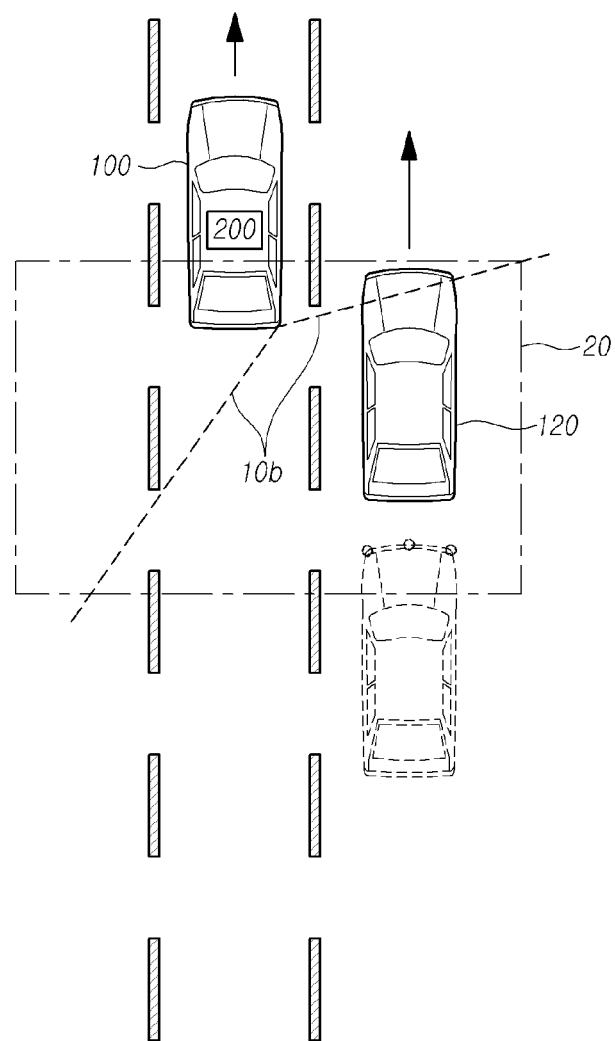

FIGS. 1A and 1B illustrate an embodiment of a blind spot detection system 200 according to the present disclosure included in a host vehicle 100 traveling on a road, and FIGS. 2A and 2B illustrate another embodiment of the blind spot detection system 200 according to the present disclosure included in the host vehicle 100 traveling on the road.

The blind spot detection system 200 according to the present disclosure is a system for controlling the host vehicle.

The blind spot detection system 200 according to the present disclosure is a system in which a sensor included in the host vehicle 100 detects a rear-side direction, and when a target vehicle 110 or 120 is detected within a predetermined blind spot alert area of the host vehicle 100, notifying the driver of the target vehicle 110 or 120 by performing a warning operation.

Whether the target vehicle 110 or 120 is detected within the blind spot alert area 20 of the host vehicle 100 is determined on the basis of whether a coordinate of a front part of the target vehicle 110 or 120 is located within the blind spot alert area 20 of the host vehicle 100.

The case in which the coordinate of the front part of the target vehicle 110 or 120 is located within the blind spot alert area 20 may be caused by a relative speed difference between the host vehicle 100 and the target vehicle 110 or 120.

For example, the case is caused when the first target vehicle 110 ahead of the host vehicle 100 approaches the host vehicle 100 while traveling at a relatively slower speed than the host vehicle 100.

In another example, the case is caused when the second target vehicle 120 in back of the host vehicle 100 approaches the host vehicle 100 while traveling at a relatively faster speed than the host vehicle 100.

Such examples are illustrated in FIGS. 1A, 1B, 2A, and 2B in detail.

Referring to FIGS. 1A and 1B, the blind spot detection system 200 according to the present disclosure included in the host vehicle 100 traveling on the road may detect the rear-side direction through a sensor having a predetermined rear-side detection boundary 10 and preset the blind spot alert area 20 of the host vehicle 100.

The rear-side detection boundary 10 is a limit range in which the rear and the rear-side of the host vehicle 100 can be detected. The limit range of the rear-side detection boundary 10 can be adjusted through a design process.

Hereinafter, for convenience of description, the limit range of the rear-side detection boundary 10 is illustrated individually as a first rear-side detection boundary 10a and a second rear-side detection boundary 10b. However, the present disclosure is not limited thereto.

The blind spot alert area 20 is a virtual area set to inform the driver of the host vehicle 100 that the target vehicle 110 or 120 approaches close to the host vehicle 100. The range of the blind spot alert area 20 can be adjusted through a design process.

Referring to FIG. 1A, the first target vehicle 110 approaches the host vehicle 100 while traveling at a slower speed than the host vehicle 100.

Since the first target vehicle 110 is located ahead of the host vehicle 100, the blind spot detection system 200 according to the present disclosure included in the host vehicle 100 may have difficulty in detecting a front coordinate indicating the location of the front part of the first target vehicle 110.

Accordingly, the blind spot detection system 200 according to the present disclosure included in the host vehicle 100 may measure a length of the part of the first target vehicle 110 detected within the rear-side detection boundary 10, and when the measured length is longer than or equal to a preset length, activate a warning.

The preset length may be a standardized length using an algorithm or simulation to be widely applied to general vehicles such as sedans.

For example, with respect to the first target vehicle 110 which is a sedan, a radar mounted to the rear-side portion of the host vehicle 100 and having a boundary range of the first rear-side detection boundary 10a transmits a transmission signal and receives a reception signal reflected from the side part of the first target vehicle 110 entering the first rear-side detection boundary 10a of the radar.

The blind spot detection system 200 according to the present disclosure measures a length d of the side part of the first target vehicle 110 from the received reception signal.

When the measured length d is longer than or equal to a preset length, the blind spot detection system 200 according to the present disclosure determines the first target vehicle 110 enters the blind spot alert area 20 and activates a warning.

Determining whether the target vehicle of which the front coordinate cannot be detected enters the blind spot alert area 20 on the basis of the measured length and the preset length may have the same effect as that of determining whether the target enters the blind spot alert area 20 by measuring the front coordinate of the target vehicle.

However, the preset length is a set value applied to general vehicles, and thus may have difficulty in being applied to special vehicles such as buses or trucks having a long longitudinal length.

Referring to FIG. 1B, with respect to the first target vehicle 110, which is a truck, the first target vehicle 110 traveling at a slower speed than the host vehicle 100 is overtaken by the host vehicle 100 at any time point and enters the blind spot alert area 20 of the host vehicle 100.

The blind spot detection system 20 according to the present disclosure included in the host vehicle 100 determines whether the first target vehicle 110 enters the blind spot alert area 20 in the same way as described with reference to FIG. 1A.

At this time, although the front part of the first target vehicle 110 has not yet entered the blind spot alert area 20, the length d of the side part of the first target vehicle 110 may satisfy the preset length.

The blind spot detection system 200 according to the present disclosure may generate a false warning even though the front part of the first target vehicle 110 is not located in the blind spot alert area 20.

As described above, the blind spot detection system 200 according to the present disclosure may not accurately decide a time point to activate a warning when determining the blind spot alert area 20 on the basis of the preset length.

Similarly, the blind spot detection system 200 according to the present disclosure may not accurately decide a time point to release an already generated warning in a special situation.

Referring to FIG. 2A, the second target vehicle 120 approaches the host vehicle 100 while traveling at a faster speed than the host vehicle 100.

Since the second target vehicle 120 is located in a rear-side area of the host vehicle 100, the blind spot detection system 200 according to the present disclosure included in the host vehicle 100 may detect a front coordinate P of the second target vehicle 120.

For example, a radar mounted to the rear-side portion of the host vehicle 100 and having a boundary range of the second rear-side detection boundary 10b may transmit a transmission signal to the second target vehicle 120 and the blind spot detection system 200 may detect the front coordinate P of the second target vehicle 120 through a reception signal reflected from the second target vehicle 120 and received by the radar.

When the front coordinate P of the second target vehicle 120 is located in the blind spot alert area 20, the blind spot detection system 200 according to the present disclosure activates a warning.

Referring to FIG. 2B, the second target vehicle 120 may overtake the host vehicle 100 at any time point. At this time, the blind spot detection system 200 according to the present disclosure deactivates the warning generated in the host vehicle 100 when the detected front coordinate P of the second target vehicle 120 is located outside the blind spot alert area 20.

However, the front coordinate P is not detected the moment the front coordinate P escapes the boundary range of the rear-side detection boundary 10.

Although the front part of the second target vehicle 120 is still located within the blind spot alert area 20, the blind spot detection system 200 according to the present disclosure may determine that the front coordinate P is located outside the blind spot alert area 20 in this case.

Accordingly, the blind spot detection system 200 according to the present disclosure deactivates the warning earlier than a time point at which the warning is originally deactivated although the front part of the second target vehicle 120 is still within the blind spot alert area 20.

In order to solve the problem, the present disclosure proposes the blind spot detection system 200 for measuring the front coordinate P of the target vehicle 110 or 120 and determining whether to activate a warning regardless of whether the target vehicle 110 or 120 is located in the front area of the rear-side area of the host vehicle 100.

Figure 3:
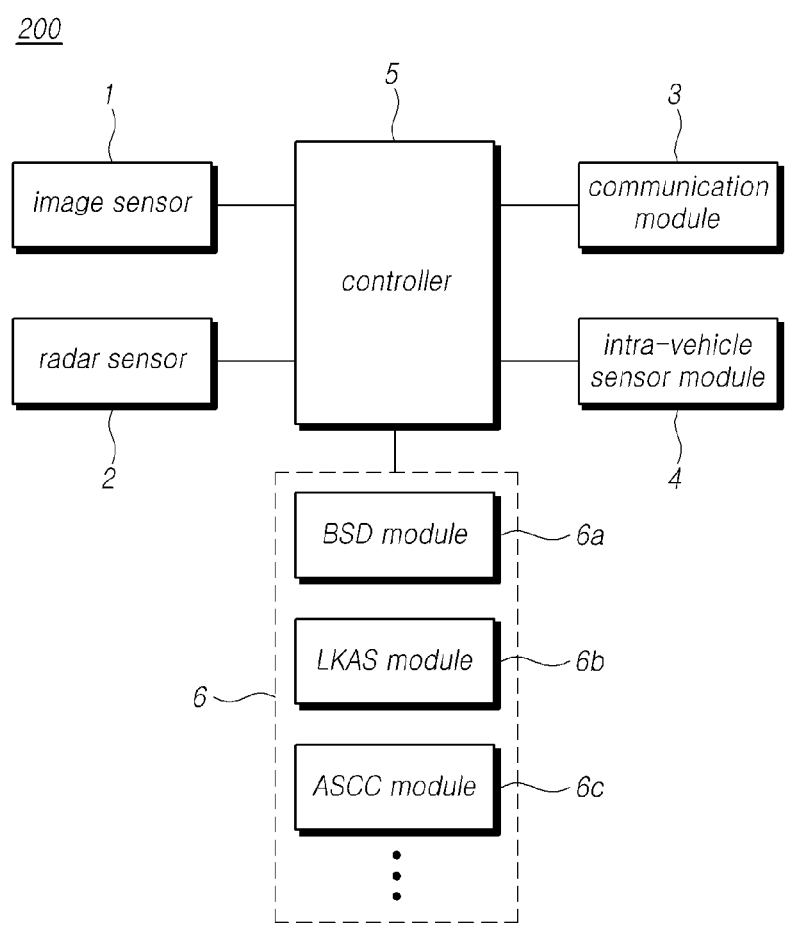
FIG. 3 illustrates an embodiment of a blind spot detection system according to the present disclosure.

FIG. 3 illustrates an embodiment of the blind spot detection system 200 according to the present disclosure.

Referring to FIG. 3, the blind spot detection system 200 according to the present disclosure may include a image sensor 1, a radar sensor 2, a communication module 3, an intra-vehicle sensor module 4, and a controller 5.

For example, the image sensor 1 may have a field of view of an interior or an exterior of the host vehicle 100 and capture image data and a processor configured to process the captured image data.

For example, the image sensor 1 may be mounted to the host vehicle 100 to have a field of view of an exterior of the host vehicle 100. At least one image sensor may be mounted to each part of the host vehicle 100 to have a field of view of the front, side, or rear of the host vehicle 100.

For example, the image sensor 1 may be mounted to the front part (a hood and headlights, etc.) of the host vehicle 100 and detect a front area of the host vehicle 100.

In another example, the image sensor 1 may be mounted to the rear part or rear-side part (a license plate, a trunk and taillights, etc.) of the host vehicle 100 and detect a rear-side area of the host vehicle 100.

For example, The image sensor 1 may include camera, Lidar sensor.

Image information captured by the image sensor consists of image data and thus may refer to image data captured by the image sensor. Hereinafter, image information captured by the image sensor in the present disclosure means image data captured by the image sensor. The image data captured by the image sensor may be generated, for example, in one format of AVI, MPEG-4, H.264, DivX, and JPEG in a raw form.

The image data captured by the image sensor may be processed by the processor. The processor may operate to process the image data captured by the image sensor.

The image data may be used to identify a vehicle type of at least one of the target vehicles 110 and 120 which approach the host vehicle 100 in the front area of the host vehicle 100 or the target vehicles 110 and 120 which approach the host vehicle 100 in the rear-side area of the host vehicle 100 in order to estimate first longitudinal lengths of the target vehicles 110 and 120 according to a stored longitudinal lengths of vehicles in a state in which a longitudinal length of the vehicle corresponding to the vehicle type is preset. However, the present disclosure is not limited thereto.

The processor may be implemented using at least one of electrical units for processing image data or performing other functions such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, and micro-processors in hardware.

Meanwhile, the radar sensor 2 is a sensor module other than the image sensor 1 for capturing an image. For example, a plurality of radar sensors 2 may be mounted to the host vehicle 100 to have a sensing area of an exterior of the host vehicle 100 to capture sensing data.

For example, the radar sensor 2 may be mounted to the front part of the host vehicle 100 and detect a front area of the host vehicle 100.

In another example, the radar sensor 2 may be mounted to the rear part or rear-side part (a license plate, a trunk and taillights, etc.) of the host vehicle 100 and detect a rear-side area of the host vehicle 100.

The communication module 3 performs a function of performing communication between vehicles, communication between the host vehicle 100 and infrastructures communication between the host vehicle 100 and a server, and intra-vehicle communication. To this end, the communication module 3 may include a transmission module and a reception module. For example, the communication module 3 may include a broadcast reception module, a wireless Internet module, a short-range communication module, a location information module, an optical communication module, and a V2X communication module.

The broadcast reception module receives broadcast signals and/or broadcast-related information from external broadcast management servers through broadcasting channels. Here, the broadcast includes at least one of a radio broadcast and a TV broadcast. The wireless Internet module may be a module for wireless Internet access and may be mounted inside or outside the host vehicle 100. The short-range communication module is for short-range communication and may support short-range communication through at least one of Bluetooth™, Radio Frequency Identification (RFID), Infrared Data Association (IrDA), Ultra-Wideband (UWB), ZigBee, Near Field Communication (NFC), Wi-Fi, Wi-Fi Direct, and wireless Universal Serial Bus (USB).

The location information module is a module for acquiring location information of the host vehicle 100 and representatively includes a Global Positioning System (GPS) module. For example, when a GPS module is used, the host vehicle 100 may acquire the location of the host vehicle 100 through a signal transmitted from a GPS satellite. Meanwhile, according to embodiments, the location information module may be an element included in the intra-vehicle sensor module 4 rather than an element included in the communication module 3.

The optical communication module may include an optical transmitter and an optical receiver. The optical transmitter and the optical receiver may convert a light signal into an electrical signal and transmit/receive information.

The V2X communication module is a module for performing wireless communication with a server, another vehicle, or an infrastructure device. The V2X communication module according to the present embodiment means an exchange of information between the host vehicle 100 and objects, such as another vehicle, a module device, and a road, through a wired/wireless network, or technology itself therefor. The V2X communication module may include concepts of Vehicle to Vehicle (V2V), Vehicle to Infrastructure (V2I), Vehicle to Nomadic Device (V2N), and Vehicle to Pedestrian (V2P). The V2X communication module is based on Dedicated Short-Range Communications (DSRC), and may use Wireless Access in Vehicular Environment (WAVE), recently developed by IEEE or IEEE 802.11p communication technology, using a 5.9 GHz band, but is not limited thereto. It should be understood that V2X includes any vehicle-to-vehicle communication that does not exist at present but is to be developed in the future.

The intra-vehicle sensor module 4 is a sensor for sensing internal information of the host vehicle 100. For example, the intra-vehicle sensor module 4 may be a torque sensor for sensing steering torque, a steering angle sensor for sensing a steering angle, a motor location sensor for sensing information on a steering motor, a vehicle speed sensor, a vehicle motion detection sensor for sensing motion of the host vehicle 100, and a vehicle position detection sensor. In addition, the intra-vehicle sensor module 4 may be a sensor for sensing various pieces of data inside the host vehicle 100 and the number thereof may be one or more.

The controller 5 may acquire data from at least one of the image sensor 1, the radar sensor 2, the communication module 3, and the intra-vehicle sensor module 4 and control various operations of the host vehicle 100 on the basis of the acquired data. Alternatively, the controller 5 may acquire image data from the image sensor 1 and process the image data. Further, the controller 5 may receive sensing data from the non-image sensor 2 and process the sensing data. Alternatively, the controller 5 may acquire data from the intra-vehicle sensor module 4 or the communication module 3 and process the data. For the processing, the controller 5 may include at least one processor.

The controller 5 may be communicatively connected to the one or more image sensors 1 and the one or more radar sensors 2.

The blind spot detection system 200 according to the present disclosure may be implemented as a combination of the above-described elements as necessary. For example, the blind spot detection system 200 includes the image sensor 1, the radar sensor 2, and the controller 5. In another example, the blind spot detection system 200 includes the image sensor 1 and the controller 5. In still another example, the blind spot detection system 200 includes the radar sensor 2 and the controller 5. However, the present disclosure is not limited thereto. The controller 5 may estimate a first longitudinal length of the target vehicle 110 or 120 which approaches the host vehicle 100 in a front area of the host vehicle 100, measure a reference coordinate and a second longitudinal length of the target vehicle 110 or 120 which goes away from the host vehicle 100 in a rear-side area of the host vehicle 100, measure a front coordinate of the target vehicle 110 or 120 based on the reference coordinate, the first longitudinal length and the second longitudinal length, and generate a warning according to whether the front coordinate of the target vehicle 110 or 120 is located in a preset blind spot alert area 20 of the host vehicle 100.

The warning may include a warning lamp on a side mirror or a Head Up Display (HUD) of the host vehicle 100, a warning sound activated through a speaker, and vibration of a steering wheel.

Wherein the controller 5 may store therein longitudinal lengths of vehicles corresponding to a vehicle types, identify a vehicle type of the target vehicle detected by the one or more image sensors 1, and estimate the first longitudinal length of the target vehicle based on a longitudinal length of a vehicle corresponding to the identified vehicle type of the target vehicle 110 or 120.

A detailed method of measuring the front coordinate will be described below with reference to FIGS. 4 to 9.

Wherein the controller 5 may measure the second longitudinal length by the one or more radar sensors, and the second longitudinal length is equal to or shorter than the first longitudinal length.

Wherein the controller 5 may measure a location coordinate of a detection point closest to the host vehicle 100 from among the plurality of detection points with respect to one side surface of the target vehicle 110 or 120 as the reference coordinates.

Wherein the controller 5 may measure the front coordinate of the target vehicle 110 or 120 by reflecting a difference value between the first longitudinal length and the second longitudinal length in the reference coordinate.

wherein the controller may deactivate the warning when the front coordinate is located outside the blind spot alert area 20 in a state in which the reference coordinate is located inside the blind spot alert area 20, and activate the warning when the front coordinate is located inside the blind spot alert area 20.

A description of the operation of the controller 5 will be made with reference to FIGS. 4 to 9.

Meanwhile, The controller 5 may recognize a target vehicle 110 or 120 detected by at least one of the one or more image sensors 1 or the one or more radar sensors 2, estimate a first longitudinal length of the target vehicle 110 or 120 which approaches the host vehicle 100 in a rear-side area of the host vehicle 100, measure a reference coordinate and a second longitudinal length of the target vehicle 110 or 120 which approaches the host vehicle 100 in a rear-side area of the host vehicle 100, measure a front coordinate of the target vehicle 110 or 120 based on the reference coordinate, the first longitudinal length and the second longitudinal length, and generate a warning according to whether the front coordinate of the target vehicle 110 or 120 is located in a preset blind spot alert area 20 of the host vehicle 100.

Wherein the controller 5 may store therein longitudinal lengths of vehicles corresponding to vehicle types, identify a vehicle type of the target vehicle 110 or 120 detected by the one or more image sensors 1, and estimate the first longitudinal length of the target vehicle based on a longitudinal length of a vehicle corresponding to the identified vehicle type of the target vehicle 110 or 120.

Wherein the controller 5 may measure the second longitudinal length by the one or more radar sensors 2, and the second longitudinal length is equal to or shorter than the first longitudinal length.

Wherein the controller 5 may measure a location coordinate of a detection point closest to the host vehicle 100 from among the plurality of detection points with respect to one side surface of the target vehicle 110 or 120 as the reference coordinates.

Wherein the controller 5 may measure the front coordinate of the target vehicle 110 or 120 by reflecting a difference value between the first longitudinal length and the second longitudinal length in the reference coordinate.

Wherein the controller 5 may generate the warning when the front coordinate is located inside the blind spot alert area 20, and deactivate the warning when the front coordinate is located outside the blind spot alert area 20 in a state in which the reference coordinate is located inside the blind spot alert area 20.

A description of the operation of the controller 5 will be made with reference to FIGS. 4 to 9.

In addition, the controller 5 may control the operation of at least one of the image sensor 1, the radar sensor 2, the communication module 3, and the intra-vehicle sensor module 4. The controller 5 may control the operation of various driver assist systems included in the host vehicle.

Alternatively, the controller 5 may transmit/receive data to/from at least one of the image sensor 1, the radar sensor 2, the communication module 3, the intra-vehicle sensor module 4, and the driver assist system modules 7 and process the data received therethrough. That is, the controller 5 may be included within the vehicle 100 and communicate with at least one module mounted into the vehicle 100. To this end, the controller 5 may further include an appropriate data link or communication link such as a vehicle network bus for data transmission or signal communication.

The controller 5 may be configured to an integrated circuit, electronic controller unit (ecu), etc.

Meanwhile, the controller 5 may be implemented as a Domain Control Unit (DCU) which can perform all of the functions of the processor, the operations of the controller 5, and function of controlling the host vehicle 100 by generating outputs to a steering control module, a brake control module, and an Adaptive Driving Assistance System (ADAS) module.

The ADAS module may be the implementation of a module by various driver assist systems, and the driver assist systems may include, for example, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), and Lane Change Assist System (LCAS). However, the present disclosure is not limited thereto.

The controller 5 may operate to control one or more of various driver assist systems (DASs) used for the host vehicle 100. For example, the controller 5 may determine a particular situation, a condition, event occurrence, and execution of a control operation on the basis of data acquired from at least one of the modules 1, 2, 3, 4, and 6.

The controller 5 may transmit a signal for controlling the operations of the various driver assist system modules 6 included in the host vehicle 100 on the basis of determined information. For example, the driver assist system modules 6 may include a Blind Spot Detection (BSD) system module 6a, a Lane Keeping Assist System (LKAS) module 6b, and an Adaptive Smart Cruise Control (ASCC) system module 6c.

In addition, the driver assistance system modules 6 included in the host vehicle 100 may have various forms, such as a Lane Departure Warning System (LDWS), a Lane Change Assist System (LCAS), a Smart Parking Assistance System (SPAS). The terms and names of the driver assist systems described herein are only for examples and are not limited thereto. The driver assist system modules 6 may include an autonomous driving module for autonomous driving. Alternatively, the driver assist system modules may control the domain control unit to perform autonomous driving of the host vehicle 100 through individual system modules included therein.

The driver assist system module 6 may include an Autonomous Emergency Braking (AEB) system for preventing a collision of the host vehicle, a Rear Cross Traffic Alert (RCTA) system, and a Blind Spot Detection (BSD) system. However, the present disclosure is not limited thereto.

Figure 4:
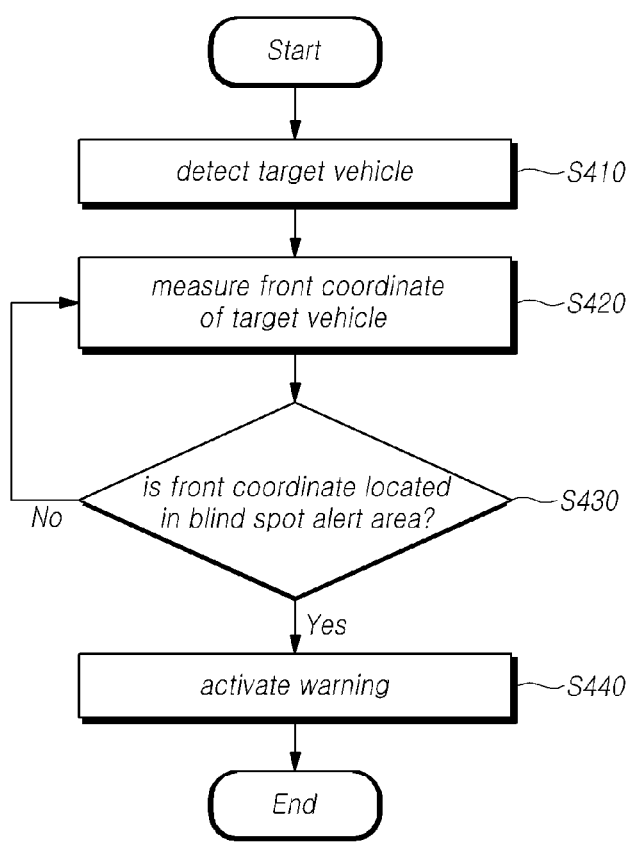
FIG. 4 is a flowchart schematically illustrating a method of operating the blind spot detection system according to the present disclosure.

FIG. 4 is a flowchart schematically illustrating a method of operating the blind spot detection system 200 according to the present disclosure.

Referring to FIG. 4, in the method of operating the blind spot detection system 200 according to the present disclosure, at least one of the image sensor 1 or the radar sensor 2 detects a target vehicle in S410.

For example, the image sensor 1 mounted to the front part of the host vehicle 100 may detect the first target vehicle 110 and the radar sensor 2 mounted to the rear-side part of the host vehicle 100 may detect the second target vehicle 120.

The method of operating the blind spot detection system 200 according to the present disclosure measures a front coordinate of the detected target vehicle in 5420.

For example, the first target vehicle 110 is detected by the image sensor 1 mounted to the front part of the host vehicle 100 or the radar sensor 2 mounted to the front part of the host vehicle 100. And The controller measures the front coordinate of the first target vehicle 110 based on the detected first target vehicle 110.

In another example, the radar sensor 2 mounted to the rear-side part of the host vehicle 100 transmits a transmission signal and receives a reception signal reflected from the front part of the second target vehicle 120. The controller 5 measures the front coordinate by detecting a coordinate of the front part of the second target vehicle 120 from the received reception signal.

If the front coordinate of the target vehicle is measured, the method of operating the blind spot detection system 200 according to the present disclosure determines whether the front coordinate of the target vehicle is located in the blind spot alert area 20 in S430.

If the front coordinate of the target vehicle is not located in the blind spot alert area 20, the method of operating the blind spot detection system 200 according to the present disclosure measures again the front coordinate of the target vehicle in S420.

When the front coordinate of the target vehicle is located in the blind spot alert area 20, the method of operating the blind spot detection system 200 according to the present disclosure activates a warning in S440.

For example, when the front coordinate of the second target vehicle 120 among the detected first target vehicle 110 and second target vehicle 120 is located in the blind spot alert area 20, the controller 5 controls a speaker of the host vehicle 100 to activate a warning sound or perform control to generate vibration of a steering wheel.

Figure 5:
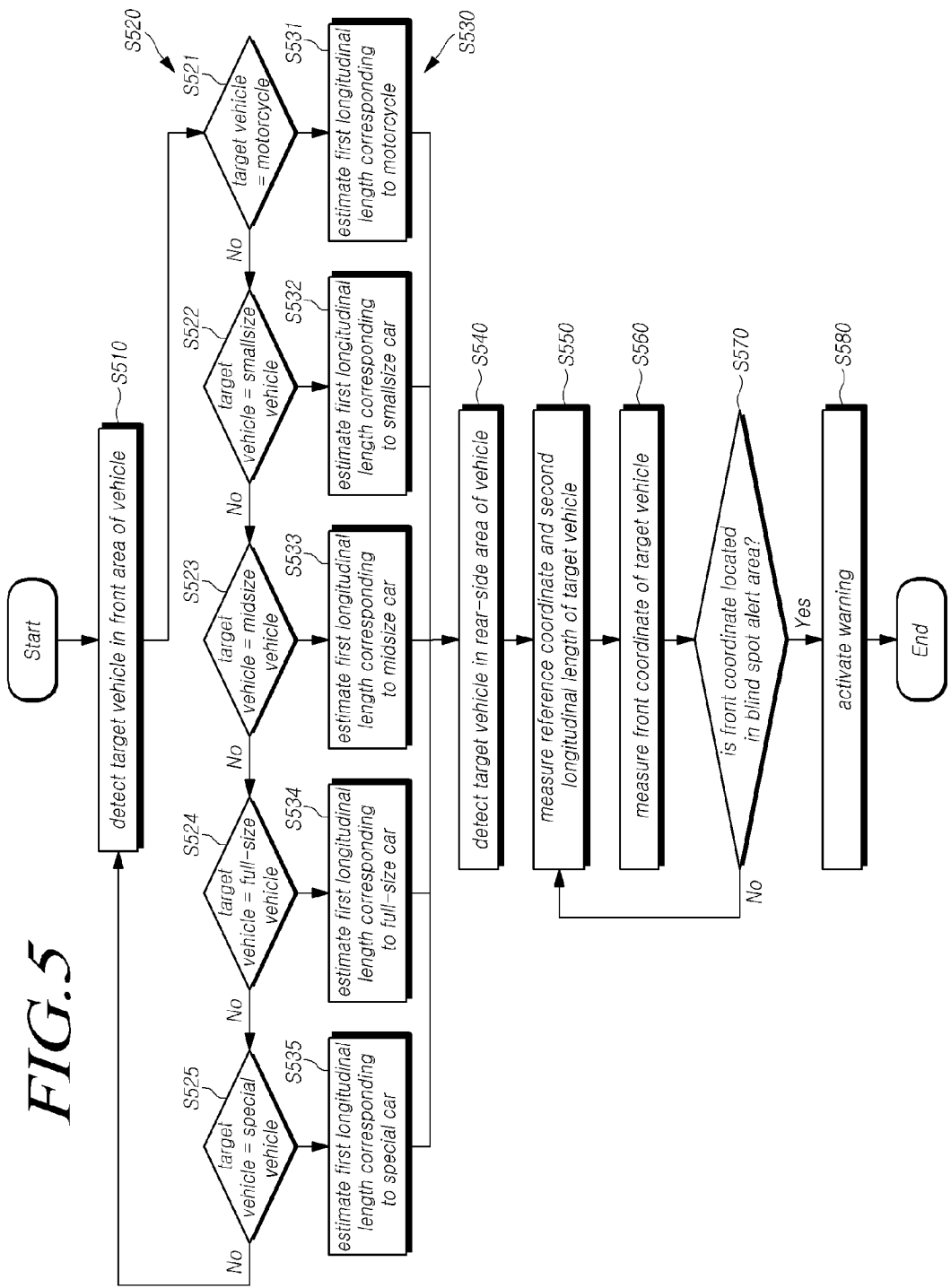
FIG. 5 is a flowchart illustrating in detail an embodiment of the method of operating the blind spot detection system according to the present disclosure.

FIG. 5 is a flowchart illustrating in detail an example of the method of operating the blind spot detection system 200 according to the present disclosure.

Referring to FIG. 5, the method of operating the blind spot detection system 200 according to the present disclosure detects the target vehicle in a front area of the host vehicle in S510.

For example, the image sensor 1 or the radar sensor 2 mounted to the front part of the host vehicle 100 detects the first target vehicle 110 existing in the front area of the host vehicle 100.

The method of operating the blind spot detection system 200 according to the present disclosure identifies the vehicle type of the target vehicle detected in the front area of the host vehicle in S520 and estimates a first longitudinal length of the target vehicle 110 based on a longitudinal length of a vehicle corresponding to the identified vehicle type of the target vehicle in S530.

The first longitudinal length corresponding to the vehicle type is a predetermined length according to each vehicle type. The first longitudinal length may be a total length of the vehicle.

For example, the controller 5 processes an image of the first target vehicle 110 captured by the the image sensor 1 and identifies the vehicle type of the first target vehicle 110 based on the processed image through an algorithm or software.

Specifically, the controller 5 processes the image of the first target vehicle 110 captured by the image sensor 1 and identifies whether the vehicle type of the first target vehicle 110 included in the processed image is a motorcycle in S521.

If the vehicle type of the first target vehicle 110 is a motorcycle, the controller 5 estimates a first longitudinal length corresponding to the motorcycle as a total longitudinal length of the first target vehicle 110 in S531.

If the vehicle type of the first target vehicle 110 is not a motorcycle, the controller 5 identifies whether the vehicle type of the first target vehicle 110 is a smallsize vehicle in S522.

If the vehicle type of the first target vehicle 110 is smallsize vehicle, the controller 5 estimates a first longitudinal length corresponding to the smallsize vehicle as a total longitudinal length of the first target vehicle 110 in S532.

If the vehicle type of the first target vehicle 110 is not a smallsize vehicle, the controller 5 identifies whether the vehicle type of the first target vehicle 110 is a midsize vehicle in S523.

If the vehicle type of the first target vehicle 110 is a midsize vehicle, the controller 5 estimates a first longitudinal length corresponding to the midsize vehicle as a total longitudinal length of the first target vehicle 110 in S533.

If the vehicle type of the first target vehicle 110 is not a midsize vehicle, the controller 5 identifies whether the vehicle type of the first target vehicle 110 is a full-size vehicle in S524.

If the vehicle type of the first target vehicle 110 is a full-size vehicle, the controller 5 estimates a first longitudinal length corresponding to the full-size vehicle as a total longitudinal length of the first target vehicle 110 in S534.

If the vehicle type of the first target vehicle 110 is not a full-size vehicle, the controller 5 identifies whether the vehicle type of the first target vehicle 110 is a special vehicle in S525.

If the vehicle type of the first target vehicle 110 is a special vehicle, the controller 5 estimates a first longitudinal length corresponding to the special vehicle as a total longitudinal length of the first target vehicle 110 in S535.

If the vehicle type of the first target vehicle 110 is not a special vehicle, the image sensor or the radar sensor 2 detects again the target vehicle in S510.

When the vehicle type of the target vehicle is identified and the first longitudinal length is estimated, the method of operating the blind spot detection system 200 according to the present disclosure detects the target vehicle, which has been detected in the front area of the host vehicle, in the rear-side area of the host vehicle in S540.

For example, when the host vehicle 100 traveling at a faster speed than the first target vehicle 110 located in the front area of the host vehicle 100 overtakes the first target vehicle 110, the image sensor 1 or the radar sensor 2 mounted to the rear-side part of the host vehicle 100 may detect the first target vehicle 110, which has been detected by the image sensor 1 or the radar sensor 2 mounted to the front part of the host vehicle 100.

When the target vehicle is detected in the rear-side area of the host vehicle, the method of operating the blind spot detection system 200 according to the present disclosure measures a reference coordinate and a second longitudinal length of the detected target vehicle in S550.

The reference coordinate is a coordinate which is a reference used when the front coordinate of the target vehicle is measured.

The reference coordinate may be measured from the located of one side surface of the target vehicle detected by the image sensor 1 or the radar sensor 2 mounted to the rear-side part of the host vehicle 100. Preferably, The reference coordinate may be a location coordinate of a detection point closest to the host vehicle 100 from among the plurality of detection points with respect to one side surface of the target vehicle 110 or 120.

The detection point closest to the host vehicle 100 is a particular point of the target vehicle 110 or 120 corresponding to a reception signal which is the closest to the host vehicle 100 and thus is received earliest among reception signals received from the one surface of the target vehicle.

For example, The detection point equal to a reflection point.

For example, when the radar sensor 2 mounted to the rear-side part of the host vehicle 100 transmits a transmission signal, the radar sensor 2 mounted to the rear-side part of the host vehicle 100 receives a reception signal reflected from the right side part of the first target vehicle 110 which matches the first rear-side detection boundary 10a.

The controller 5 measures the reference coordinate by recognizing a location coordinate of one reflection point of the first target vehicle 110 corresponding to a reception signal received first among the reception signals.

The second longitudinal length is a longitudinal length of the target vehicle measured based on the reception signal reflected from the one surface of the target vehicle detected in the rear-side area of the host vehicle 100.

Accordingly, if the estimated first longitudinal length means the total longitudinal length of the target vehicle, the second longitudinal length may be equal to the first longitudinal length or smaller than the second longitudinal length.

For example, the radar sensor 2 mounted to the rear-side part of the host vehicle 100 detects the first target vehicle 110 detected by the image sensor 1 mounted to the front part of the host vehicle 100.

The controller 5 measures the second longitudinal length of the first target vehicle 110 based on reflection points of the first target vehicle 110 detected in the rear-side area of the host vehicle 100.

If the reference coordinate and the second longitudinal length of the target vehicle are measured, the method of operating the blind spot detection system 200 according to the present disclosure measures the front coordinate of the target vehicle in S560.

For example, the controller 5 may measure the front coordinate of the first target vehicle 110 based on the first longitudinal length of the first target vehicle 110 and the reference coordinate and the second longitudinal length of the first target vehicle 110.

That is, the controller 5 may identify the vehicle type of the first target vehicle 110 detected by the image sensor 1 and estimate the first longitudinal length of the first target vehicle 110 based on a longitudinal length of a vehicle corresponding to the identified vehicle type of the first target vehicle 110.

The controller 5 may reflect a difference value between the estimated first longitudinal length and the measured second longitudinal length in the reference coordinate to measure the front coordinate.

For example, the controller 5 measures the front coordinate by adding the difference value between the estimated first longitudinal length and the measured second longitudinal length to a longitudinal component among transverse and longitudinal components of the reference coordinate.

When the front coordinate of the target vehicle is measured, the method of operating the blind spot detection system 200 according to the present disclosure determines whether the front coordinate of the target vehicle is located in the blind spot alert area 20 in S570.

If the front coordinate of the target vehicle is not located in the blind spot alert area 20, the method of operating the blind spot detection system 200 according to the present disclosure measures again the reference coordinate and the second longitudinal length of the target vehicle in S550.

If the front coordinate of the target vehicle is located in the blind spot alert area 20, the method of operating the blind spot detection system 200 according to the present disclosure activates a warning in S580.

FIG. 6 is a flowchart illustrating in detail another example of the method of operating the blind spot detection system 200 according to the present disclosure.

Referring to FIG. 6, the method of operating the blind spot detection system 200 according to the present disclosure detects the target vehicle in a rear-side area of the host vehicle in S610.

For example, the image sensor 1 or the radar sensor 2 mounted to the rear-side part of the host vehicle 100 detects the second target vehicle 120 existing in the rear-side area of the host vehicle 100.

In another example, the radar sensor 2 mounted to the rear-side part of the host vehicle 100 may detect a length of at least the part of the one side surface of the second target vehicle 120. That is, the radar sensor 2 mounted to the rear-side part of the host vehicle 100 transmits a transmission signal and receives a reception signal reflected from the left side surface of the second target vehicle 120, so as to detect the second target vehicle 120 existing in the rear-side area of the host vehicle 100.

The method of operating the blind spot detection system 200 according to the present disclosure acquires information on a first longitudinal length, a reference coordinate, and a second longitudinal length of the target vehicle detected in the rear-side area of the host vehicle in S620.

Specifically, the method of operating the blind spot detection system 200 according to the present disclosure identifies the vehicle type of the target vehicle in S621 and estimates a first longitudinal length corresponding to the identified vehicle type in S622.

the method of operating the blind spot detection system 200 according to the present disclosure measures a reference coordinate and a second longitudinal length of the target vehicle in S623.

For example, the image sensor 1 and the radar sensor 2 mounted to the rear-side part of the host vehicle 100 detect the second target 120, and the controller 5 processes an image of the second target vehicle 120, identifies the vehicle type of the second target vehicle 120 from the processed image through an algorithm or software, and estimates a first longitudinal length corresponding to the identified vehicle type of the second target vehicle 120 in S622.

Further, the controller 5 receives a reception signal reflected from the side surface of the second target vehicle 120, measures a second longitudinal length of the second target vehicle 120, and measures a reference coordinate by measuring a location coordinate of a reflection point closest to the host vehicle from among the plurality of reflection points with respect to one side surface (left side surface) of the second target vehicle 120.

If the first longitudinal length, the reference coordinate, and the second longitudinal length of the target vehicle are measured, the method of operating the blind spot detection system 200 according to the present disclosure measures a front coordinate of the target vehicle in S630.

For example, the controller 5 may measure the front coordinate of the second target vehicle 120 based on the first longitudinal length of the second target vehicle 120 and the reference coordinate and the second longitudinal length of the second target vehicle 120.

Since a process of determining whether the front coordinate of the target vehicle is located in the blind spot alert area 20 in S640 and a process of activating the warning in S650 are the same as the processes described with reference to FIGS. 4 and 5, a detailed description thereof will be omitted.

For understanding of the operation of the blind spot detection system 200 according to the present disclosure, FIGS. 7 to 9 illustrate in detail a situation in which a host vehicle travels on a road by way of example.

Hereinafter, for convenience of description, the first target vehicle 110 is a truck and the second target vehicle 120 is a sedan. However, the present disclosure is not limited thereto.

Figure 7A:
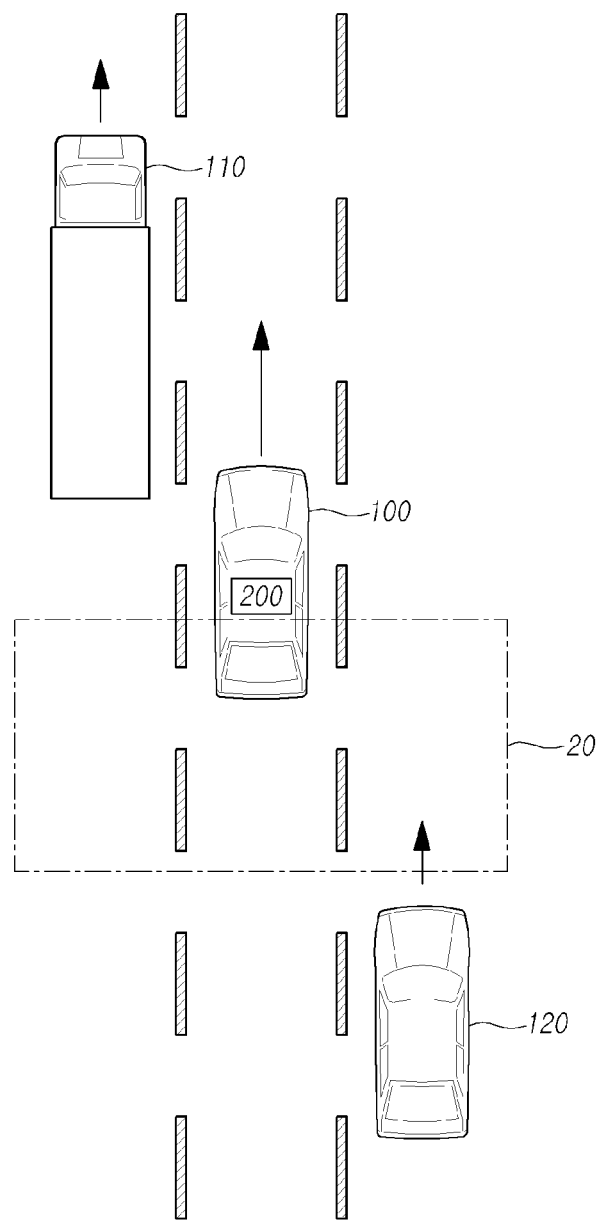
FIGS. 7A to 7C illustrate a first warning operation of the host vehicle including the blind spot detection system according to the present disclosure.
Figure 7B:
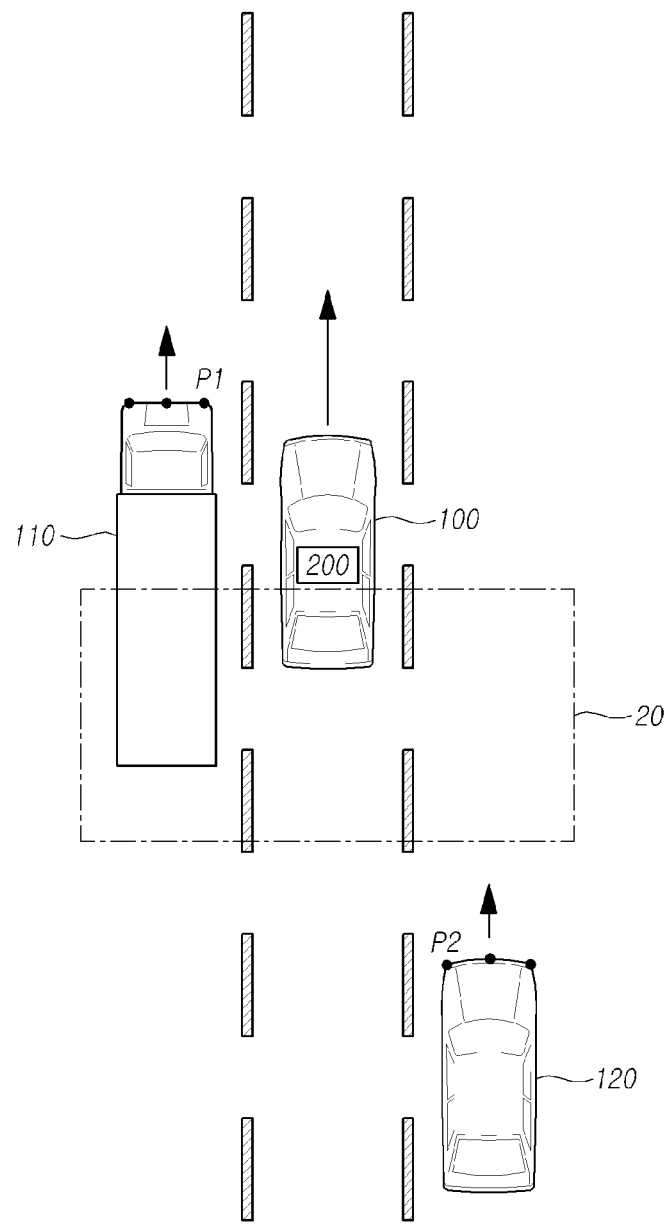
Figure 7C:
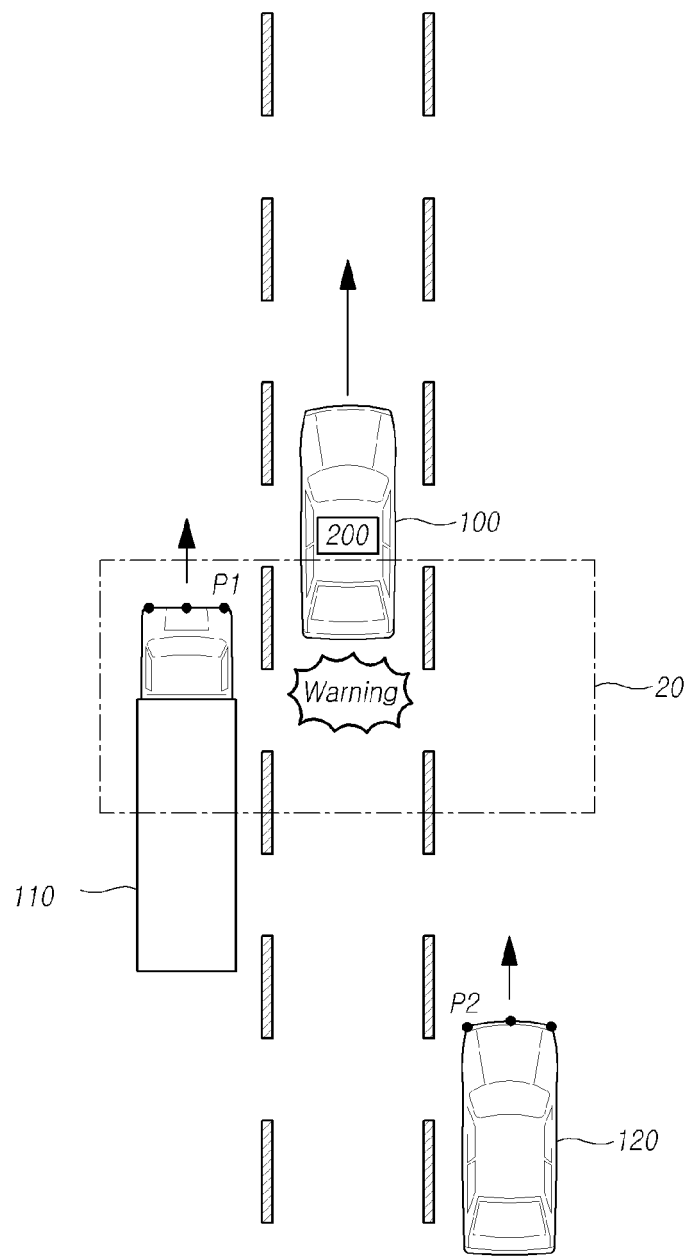

FIGS. 7A to 7C illustrate a first warning operation of the host vehicle 100 including the blind spot detection system 200 according to the present disclosure.

Referring to FIGS. 7A to 7C, the first target vehicle 110 existing in a front area of the host vehicle 100, the second target vehicle 120 existing in a rear-side area of the host vehicle 100, and the host vehicle 100 travel on the road at different speeds.

For convenience of description, a traveling speed of the first target vehicle 110 and a traveling speed of the second target vehicle 120 are slower than a traveling speed of the host vehicle 100. However, the present disclosure is not limited thereto.

Referring to FIG. 7A, the blind spot detection system 200 according to the present disclosure included in the host vehicle 100 detects the first target vehicle 110 and the second target vehicle 120.

For example, the image sensor 1 mounted to the front part of the host vehicle 100 detects the first target vehicle 110.

In another example, the image sensor 1 mounted to the rear-side part of the host vehicle 100 detects the second target vehicle 120.

The blind spot detection system 200 according to the present disclosure included in the host vehicle 100 determines whether at least one of the first target vehicle 110 and the second target vehicle 120 enters the blind spot alert area 20 of the host vehicle 100.

For example, the controller 5 determines whether the first target vehicle 110 enters the blind spot alert area 20 of the host vehicle 100.

Referring to FIG. 7B, the blind spot detection system 200 according to the present disclosure included in the host vehicle 100 measures a front coordinate P1 of the first target vehicle 110 and a front coordinate P2 of the second target vehicle 120.

For example, the controller 5 measures the front coordinate P1 of the first target vehicle 110 detected by the image sensor 1 mounted to the front part of the host vehicle 100.

In another example, the controller 5 measures the front coordinate P2 of the second target vehicle 120 detected by the image sensor 1 mounted to the rear-side part of the host vehicle 100.

When the time goes by, the host vehicle 100 overtakes the first target vehicle 110.

Referring to FIG. 7C, the blind spot detection system 200 according to the present disclosure included in the host vehicle 100 determines whether the front coordinate P1 of the first target vehicle 110 is located in the blind spot alert area 20 of the host vehicle 100, and when the front coordinate P1 is located in the blind spot alert area 20, provides an alarm to the driver of the host vehicle 100.

Figure 8A:
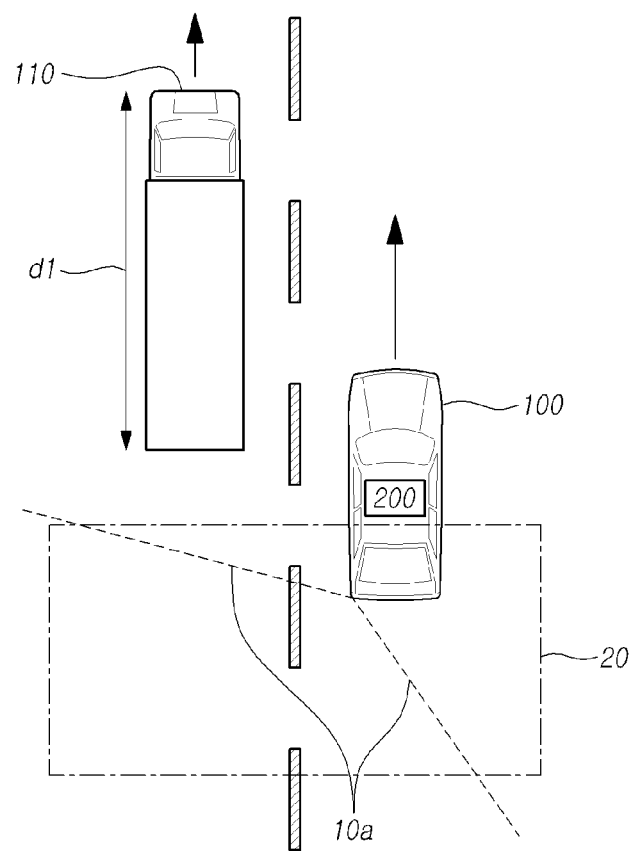
FIGS. 8A to 8C illustrate a second warning operation of the host vehicle including the blind spot detection system according to the present disclosure.
Figure 8B:
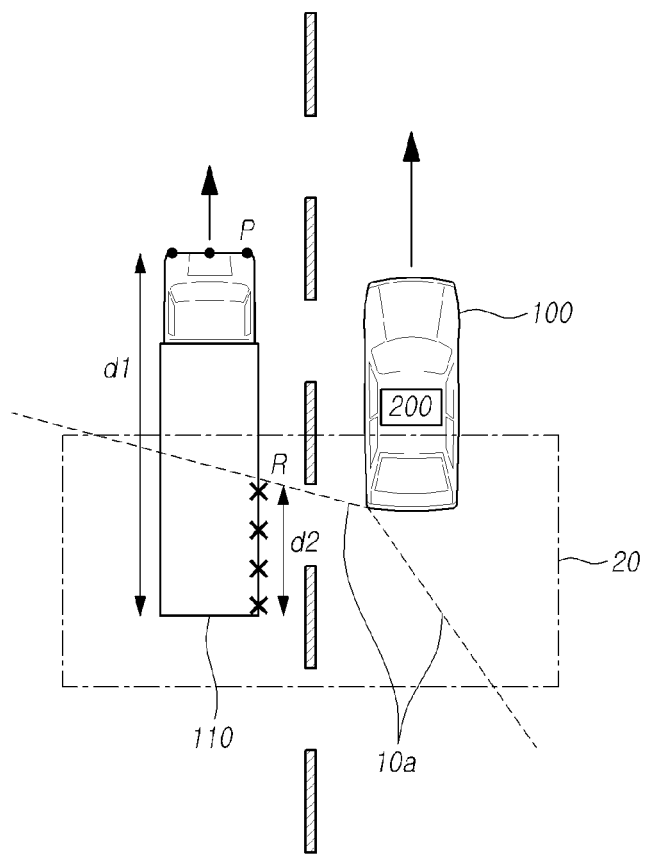
Figure 8C:
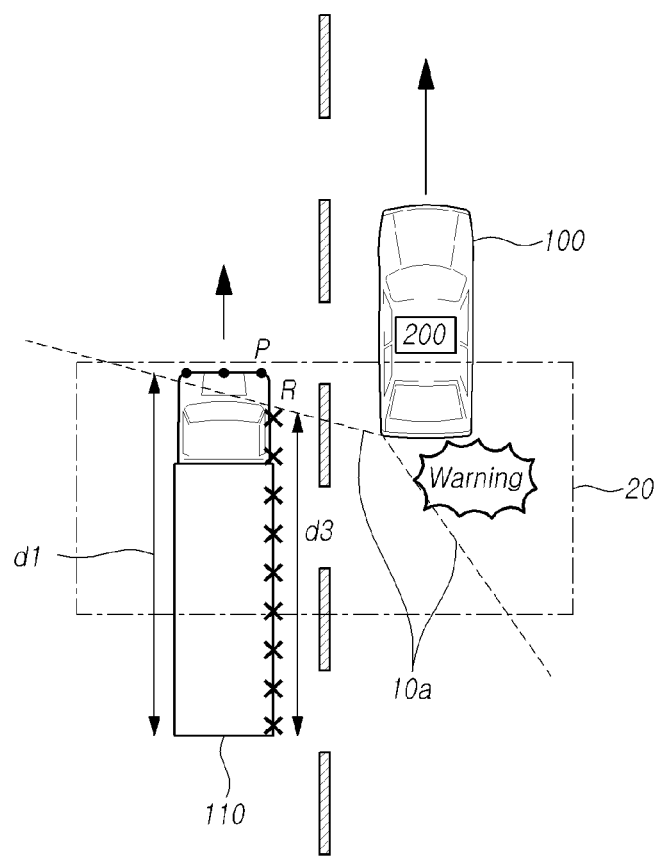

FIGS. 8A to 8C illustrate a second warning operation of the host vehicle 100 including the blind spot detection system 200 according to the present disclosure.

Referring to FIGS. 8A to 8C, the host vehicle 100 and the first target vehicle 110 existing in a forward area of the host vehicle 100 travel on the road at different speeds.

Referring to FIG. 8A, the blind spot detection system 200 according to the present disclosure included in the host vehicle 100 detects the first target vehicle 110 and determines whether the first target vehicle 110 enters the blind spot alert area 20 of the host vehicle 100.

The blind spot detection system 200 according to the present disclosure included in the host vehicle 100 identifies the vehicle type of the first target vehicle 110 and identifies that the vehicle type of the first target vehicle 110 is a truck.

For example, the image sensor 1 mounted to the front part of the host vehicle 100 detects the first target vehicle 110, and the controller 5 recognizes the first target vehicle 110 and identifies the vehicle type of the first target vehicle 110.

If it is identified that the vehicle type of the first target vehicle 110 is a truck, the blind spot detection system 200 according to the present disclosure included in the host vehicle 100 estimates a total first longitudinal length d1 of the truck as a total longitudinal length of the first target vehicle 110.

For example, The controller 5 estimates the longitudinal length of the truck (the first target vehicle 110) of the first target vehicle 110.

Referring to FIG. 8B, when the host vehicle 100 starts overtaking the first target vehicle 110, the blind spot detection system 200 according to the present disclosure included in the host vehicle 100 measures a reference coordinate R and a second longitudinal length d2 in the rear-side area of the first target vehicle 110 located in the first rear-side detection boundary 10a.

For example, The radar sensor 2 mounted to the rear-side part of the host vehicle 100 detect one side surface (for example, the right side surface) of the first target vehicle 110. And The controller 5 measures the second longitudinal length by the radar sensor 2 (the second longitudinal length is equal to or shorter than the first longitudinal length), and measures a location coordinate of a detection point closest to the host vehicle 100 from among the plurality of detection points with respect to one side surface (for example, the right side surface) of the first target vehicle 110 as the reference coordinates.

If the reference coordinate R and the second longitudinal length d2 are measured, the blind spot detection system 200 according to the present disclosure included in the host vehicle 100 may measure a front coordinate P of the first target vehicle 110 by adding a difference value (d1-d2) between the estimated first longitudinal length d1 and the measured second longitudinal length d2 to a longitudinal component of the reference coordinate R.

Specifically, the front coordinate P, for example, may be a coordinate of a right corner on the front part of the first target vehicle 110.

Meanwhile, the blind spot detection system 200 may measure a coordinate of an entire front part of the first target vehicle 110 by adding an interval value preset for the measured front coordinate P to a transverse component of the front coordinate P.

Referring to FIG. 8C, when the front coordinate P of the first target vehicle 110 is measured, the blind spot detection system 200 according to the present disclosure included in the host vehicle 100 determines whether to activate a warning based on whether the front coordinate P of the first target vehicle 110 is located in the blind spot alert area 20 of the host vehicle 100.

The blind spot detection system 200 according to the present disclosure included in the host vehicle 100 measures a reference coordinate and a second longitudinal length until the front coordinate P of the first target vehicle 110 is located in the blind spot alert area 20 of the host vehicle 100.

When the front coordinate P of the first target vehicle 110 calculated based on the reference coordinate R and the second longitudinal length d3 is located in the blind spot alert area 20 of the host vehicle 100, the blind spot detection system 200 according to the present disclosure included in the host vehicle 100 activates a warning.

For example, the controller 5 deactivates the warning when the front coordinate P is located outside the blind spot alert area 20 in a state in which the reference coordinate R is located inside the blind spot alert area 20, and activates the warning when the front coordinate P is located inside the blind spot alert area 20.

Figure 9A:
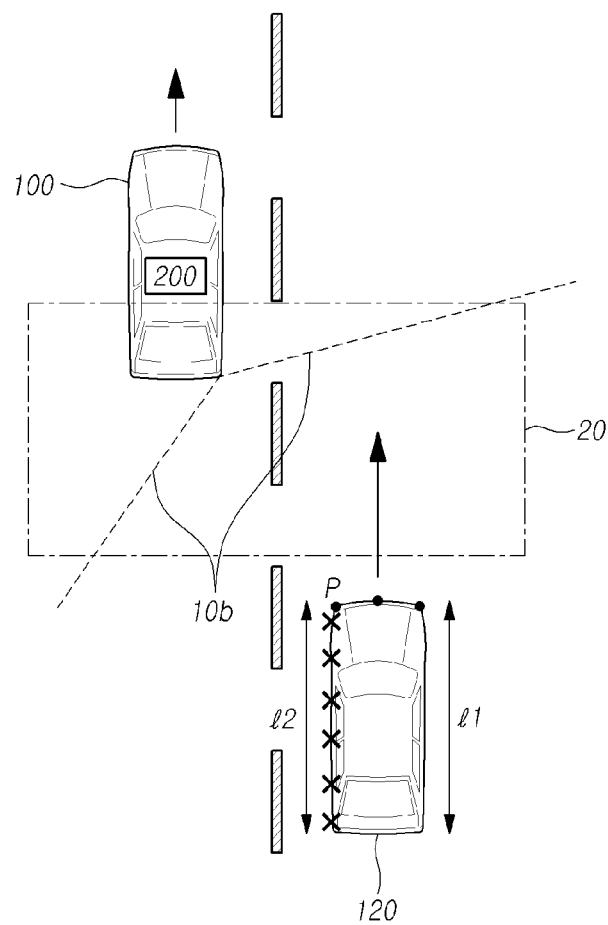
FIGS. 9A to 9C illustrate a third warning operation of the host vehicle including the blind spot detection system according to the present disclosure.
Figure 9B:
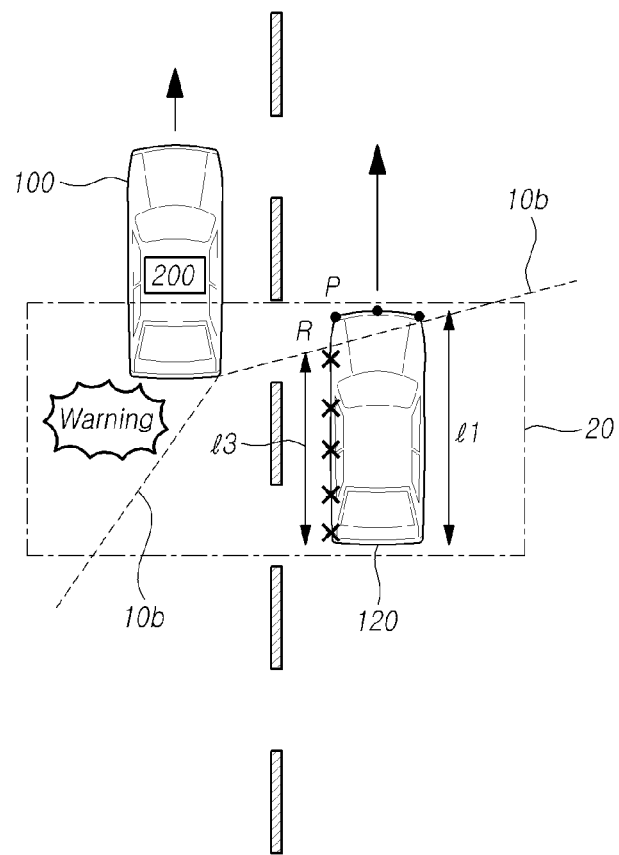
Figure 9C:
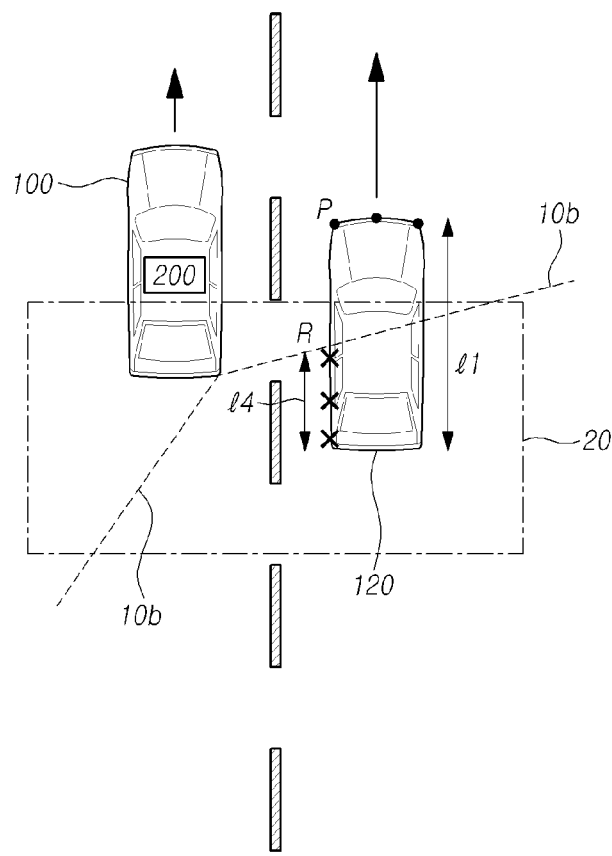

FIGS. 9A to 9C illustrate a third warning operation of the host vehicle 100 including the blind spot detection system 200 according to the present disclosure.

Referring to FIGS. 9A to 9C, the host vehicle 100 and the second target vehicle 120 existing in the rear-side area of the host vehicle 100 travel on the road at different speeds.

Referring to FIG. 9A, the blind spot detection system 200 according to the present disclosure included in the host vehicle 100 detects the second target vehicle 120 and determines whether the second target vehicle 120 enters the blind spot alert area 20 of the host vehicle 100.

The blind spot detection system 200 according to the present disclosure included in the host vehicle 100 identifies the vehicle type of the second target vehicle 120 and identifies that the vehicle type of the second target vehicle 120 is a sedan.

For example, the image sensor 1 mounted to the rear-side part of the host vehicle 100 detects the second target vehicle 120, and the controller 5 recognizes the second target vehicle 120 and identifies the vehicle type of the second target vehicle 120.

If it is identified that the vehicle type of the second target vehicle 120 is a sedan, the blind spot detection system 200 according to the present disclosure included in the host vehicle 100 estimates a total first longitudinal length l1 of the sedan as a total longitudinal length of the second target vehicle 120.

For example, The controller 5 estimates the longitudinal length of the sedan (the second target vehicle 120) of the second target vehicle 120.

Meanwhile, the blind spot detection system 200 according to the present disclosure included in the host vehicle 100 measures a reference coordinate and a second longitudinal length l2 of the second target vehicle 120.

For example, The radar sensor 2 mounted to the rear-side part of the host vehicle 100 detect one side surface (for example, the left side surface) of the second target vehicle 120. And the controller 5 measures the second longitudinal length by the radar sensor 2, and measures a location coordinate of a detection point closest to the host vehicle 100 from among the plurality of detection points with respect to one side surface (for example, the left side surface) of the second target vehicle 110 as the reference coordinates. The blind spot detection system 200 according to the present disclosure included in the host vehicle 100 calculates a front coordinate P based on the estimated first longitudinal length l1, the measured reference coordinate, and the second longitudinal length l2.

Since the second longitudinal length l2 is the same as the first longitudinal length l1 before the second target vehicle 120 passes the second rear-side detection boundary 10b, the reference coordinate and the front coordinate P may be the same coordinate.

Referring to FIG. 9B, when the time go by and the front coordinate P of the second target vehicle 120 is located in the blind spot alert area 20 of the host vehicle 100, the blind spot detection system 200 according to the present disclosure included in the host vehicle 100 activates a warning.

The blind spot detection system 200 according to the present disclosure included in the host vehicle 100 repeatedly measures the front coordinate P by measuring the reference coordinate and the second longitudinal length in order to continuously determine whether the front coordinate P of the second target vehicle 120 is located in the blind spot alert area 20 of the host vehicle 100.

That is, the blind spot detection system 200 according to the present disclosure included in the host vehicle 100 measures the front coordinate P of the second target vehicle 120 by adding a difference value (l1-l3) between the estimated first longitudinal length l1 and the measured second longitudinal length to a longitudinal component of the reference coordinate R.

The front coordinate P, for example, may be a coordinate of a left corner on the front part of the second target vehicle 120.

Meanwhile, the blind spot detection system 200 may measure a coordinate of an entire front part of the second target vehicle 120 by adding an interval value preset for the measured front coordinate P to a transverse component of the front coordinate P.

Referring to FIG. 9C, the blind spot detection system 200 according to the present disclosure included in the host vehicle 100 measures the reference coordinate and the second longitudinal length until the front coordinate P of the second target vehicle 120 is located outside the blind spot alert area 20 of the host vehicle 100.

That is, the blind spot detection system 200 measures the front coordinate P of the second target vehicle 120 by adding a difference value (l1-l4) between the estimated first longitudinal length l1 and a second longitudinal length l4 to a longitudinal component of the reference coordinate R in the state in which the reference coordinate R of the second target vehicle 120 is located in the preset blind spot alert area 20.

When the front coordinate P of the second target vehicle 120 is located outside the blind spot alert area 20 of the host vehicle 100, the blind spot detection system 200 according to the present disclosure included in the host vehicle 100 may determine the deactivate of the warning.

For example, the controller activates the warning when the front coordinate P is located inside the blind spot alert area 20, and deactivates the warning when the front coordinate P is located outside the blind spot alert area 20 in a state in which the reference coordinate R is located inside the blind spot alert area 20.

Hereinafter, a method for controlling a host vehicle which may implement all of the present disclosure will be described.

Figure 10:
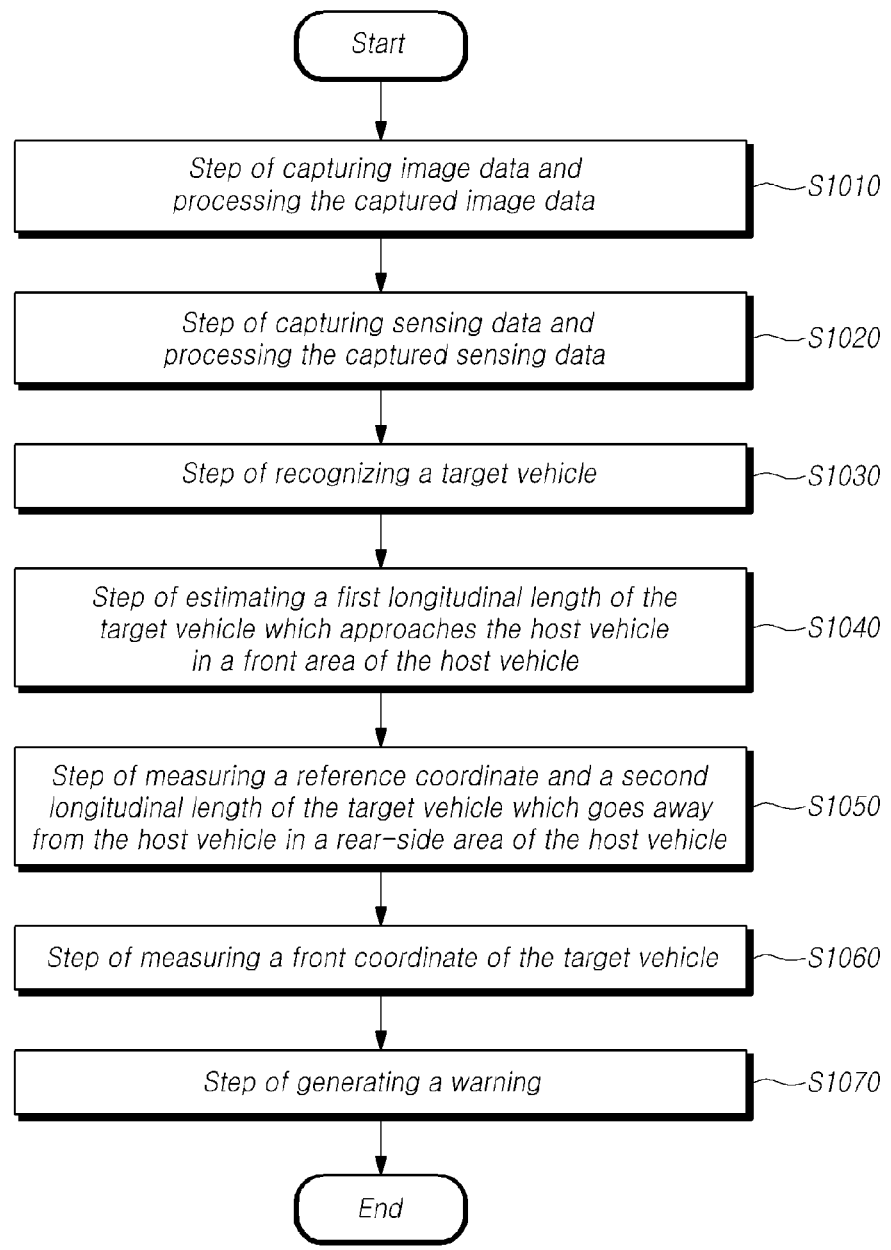
FIG. 10 is a flowchart illustrating an embodiment of a blind spot detection method according to the present disclosure.

FIG. 10 is a flowchart illustrating an embodiment of a blind spot detection method according to the present disclosure.

Figure 11:
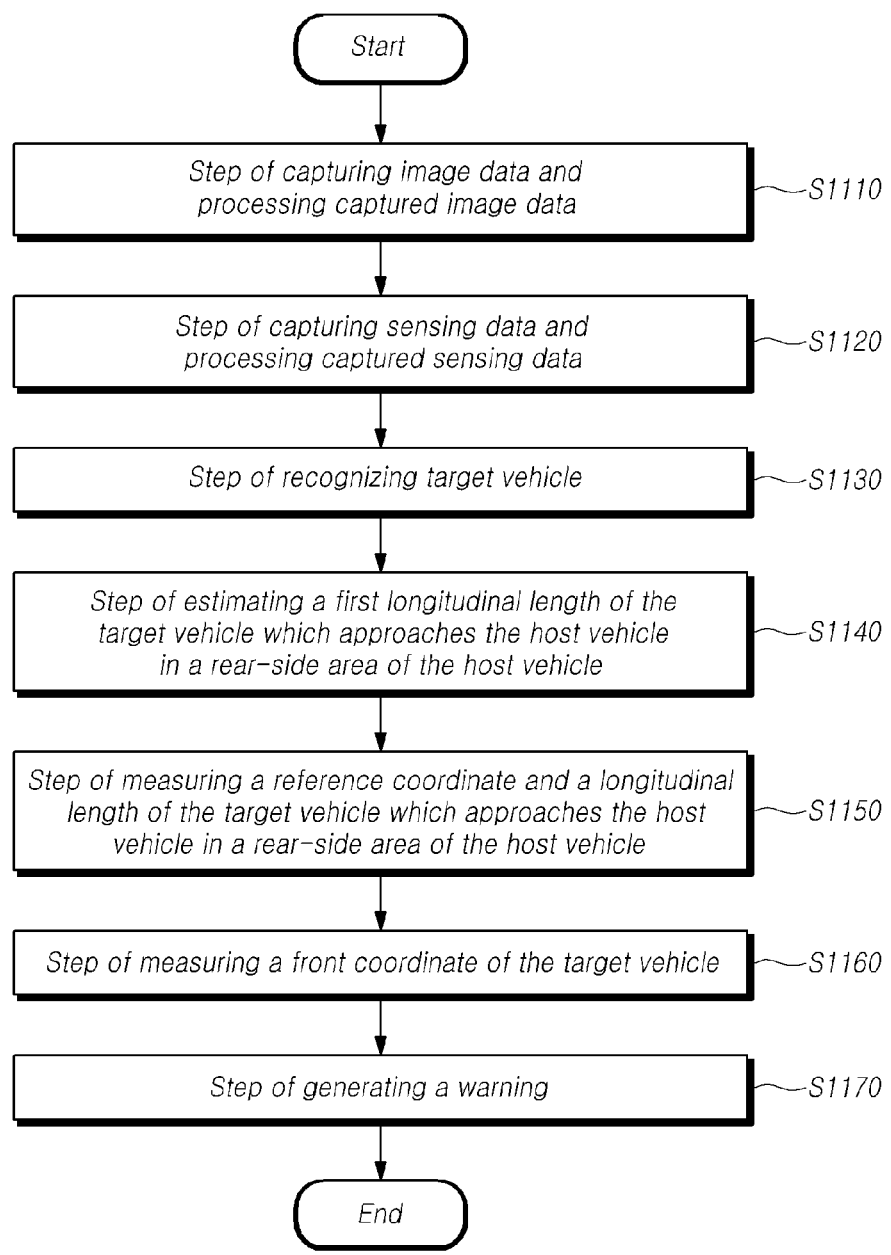
FIG. 11 is a flowchart illustrating another embodiment of a blind spot detection method according to the present disclosure.

Referring to FIG. 10, a blind spot detection method according to the present disclosure may include a step S1010 of capturing image data by one or more image sensors and processing the captured image data by one or more image sensors mounted to a host vehicle to have a field of view of an exterior of the host vehicle, a step S1020 of capturing sensing data by one or more radar sensors and processing the captured sensing data, a step S1030 of recognizing a target vehicle detected by at least one of the one or more image sensors or the one or more radar sensors, a step S1040 of estimating a first longitudinal length of the target vehicle which approaches the host vehicle in a front area of the host vehicle, a step S1050 of measuring a reference coordinate and a second longitudinal length of the target vehicle which goes away from the host vehicle in a rear-side area of the host vehicle, a step S1060 of measuring a front coordinate of the target vehicle based on the reference coordinate, the first longitudinal length and the second longitudinal length, and a step S1070 of generating a warning according to whether the front coordinate of the target vehicle is located in a preset blind spot alert area of the host vehicle. FIG. 11 is a flowchart illustrating another embodiment of a blind spot detection method according to the present disclosure.

Referring to FIG. 11, a blind spot detection method according to the present disclosure may include a step S1110 of capturing image data by one or more image sensors and processing the captured image data, a step S1120 of capturing sensing data by one or more radar sensors and processing the captured sensing data, a step S1130 of recognizing a target vehicle detected by at least one of the one or more image sensors or the one or more radar sensors, a step S1140 of estimating a first longitudinal length of the target vehicle which approaches the host vehicle in a rear-side area of the host vehicle, a step S1150 of measuring a reference coordinate and a longitudinal length of the target vehicle which approaches the host vehicle in a rear-side area of the host vehicle, a step S1160 of measuring a front coordinate of the target vehicle based on the reference coordinate, the first longitudinal length and the second longitudinal length, and a step S1170 of generating a warning according to whether the front coordinate of the target vehicle is located in a preset blind spot alert area 20 of the host vehicle.

As described above, the present disclosure can provide a system for controlling a host vehicle and a method for controlling a host vehicle which appropriately control a warning for another vehicle which approaches a blind spot of a host vehicle.

Further, the present disclosure can provide driving safety and driving convenience to a driver by accurately controlling a time point for activating or deactivating a warning to prevent a malfunction of the warning control.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed based on the accompanying claims in such a manner that all of the technical ideas included within the scope equivalent to the claims belong to the present disclosure.

What is claimed is:

1. A system for controlling a host vehicle, the system comprising:
   one or more image sensors mounted to a host vehicle to have a field of view of an exterior of the host vehicle;
   one or more radar sensors mounted to the host vehicle to have a sensing area of an exterior of the host vehicle; and
   a controller communicatively connected to the one or more image sensors and the one or more radar sensors, and configured to:
   recognize a target vehicle detected by at least one of the one or more image sensors or the one or more radar sensors,
   estimate a first longitudinal length of the target vehicle which approaches the host vehicle in a front area of the host vehicle,
   measure a reference coordinate and a second longitudinal length of the target vehicle which goes away from the host vehicle in a rear-side area of the host vehicle,
   measure a front coordinate of the target vehicle based on the reference coordinate, the first longitudinal length and the second longitudinal length, and
   generate a warning according to whether the front coordinate of the target vehicle is located in a preset blind spot alert area of the host vehicle.

2. The system of claim 1, wherein the controller is configured to:
   store therein longitudinal lengths of vehicles corresponding to vehicle types;
   identify a vehicle type of the target vehicle detected by the one or more image sensors; and
   estimate the first longitudinal length of the target vehicle based on a longitudinal length of a vehicle corresponding to the identified vehicle type of the target vehicle.

3. The system of claim 1, wherein the controller measures the second longitudinal length by the one or more radar sensors, and
   the second longitudinal length is equal to or shorter than the first longitudinal length.

4. The system of claim 1, wherein the controller measures a location coordinate of a detection point closest to the host vehicle from among the plurality of detection points with respect to one side surface of the target vehicle as the reference coordinates.

5. The system of claim 1, wherein the controller measures the front coordinate of the target vehicle by reflecting a difference value between the first longitudinal length and the second longitudinal length in the reference coordinate.

6. The system of claim 1, wherein the controller deactivates the warning when the front coordinate is located outside the blind spot alert area in a state in which the reference coordinate is located inside the blind spot alert area, and
activates the warning when the front coordinate is located inside the blind spot alert area.

7. A system for controlling a host vehicle, the system comprising:
one or more image sensors mounted to a host vehicle to have a field of view of an exterior of the host vehicle;
one or more radar sensors mounted to the host vehicle to have a sensing area of or an exterior of the host vehicle; and
a controller communicatively connected to the one or more image sensors and the one or more radar sensors, and configured to:
recognize a target vehicle detected by at least one of the one or more image sensors or the one or more radar sensors,
estimate a first longitudinal length of the target vehicle which approaches the host vehicle in a rear-side area of the host vehicle,
measure a reference coordinate and a second longitudinal length of the target vehicle which approaches the host vehicle in a rear-side area of the host vehicle,
measure a front coordinate of the target vehicle based on the reference coordinate, the first longitudinal length and the second longitudinal length, and
generate a warning according to whether the front coordinate of the target vehicle is located in a preset blind spot alert area of the host vehicle.

8. The system of claim 7, wherein the controller is configured to:
store therein longitudinal lengths of vehicles corresponding to vehicle types;
identify a vehicle type of the target vehicle detected by the one or more image sensors, and
estimate the first longitudinal length of the target vehicle based on a longitudinal length of a vehicle corresponding to the identified vehicle type of the target vehicle.

9. The system of claim 7, wherein the controller measures the second longitudinal length by the one or more radar sensors, and
the second longitudinal length is equal to or shorter than the first longitudinal length.

10. The system of claim 7, wherein the controller measures a location coordinate of a detection point closest to the host vehicle from among the plurality of detection points with respect to one side surface of the target vehicle as the reference coordinates.

11. The system of claim 7, wherein the controller measures the front coordinate of the target vehicle by reflecting a difference value between the first longitudinal length and the second longitudinal length in the reference coordinate.

12. The system of claim 7, wherein the controller activates the warning when the front coordinate is located inside the blind spot alert area, and
deactivates the warning when the front coordinate is located outside the blind spot alert area in a state in which the reference coordinate is located inside the blind spot alert area.

13. A method for controlling a host vehicle, the method comprising:
capturing image data by one or more image sensors and processing the captured image data;
capturing sensing data by one or more radar sensors and processing the captured sensing data;
recognizing a target vehicle detected by at least one of the one or more image sensors or the one or more radar sensors;
estimating a first longitudinal length of the target vehicle which approaches the host vehicle in a front area of the host vehicle;
measuring a reference coordinate and a second longitudinal length of the target vehicle which goes away from the host vehicle in a rear-side area of the host vehicle;
measuring a front coordinate of the target vehicle based on the reference coordinate, the first longitudinal length and the second longitudinal length; and
generating a warning according to whether the front coordinate of the target vehicle is located in a preset blind spot alert area of the host vehicle.

14. A method for controlling a host vehicle, the method comprising:
capturing image data by one or more image sensors and processing the captured image data;
capturing sensing data by one or more radar sensors and processing the captured sensing data;
recognizing a target vehicle detected by at least one of the one or more image sensors or the one or more radar sensors;
estimating a first longitudinal length of the target vehicle which approaches the host vehicle in a rear-side area of the host vehicle;
measuring a reference coordinate and a longitudinal length of the target vehicle which approaches the host vehicle in a rear-side area of the host vehicle;
measuring a front coordinate of the target vehicle based on the reference coordinate, the first longitudinal length and the second longitudinal length;
generating a warning according to whether the front coordinate of the target vehicle is located in a preset blind spot alert area of the host vehicle.

* * * * *